(12) United States Patent
Cagle et al.

(10) Patent No.: US 12,070,119 B2
(45) Date of Patent: Aug. 27, 2024

(54) TWIST SEAL ORAL FLUID DELIVERY DEVICE

(71) Applicant: Sage Products, LLC, Cary, IL (US)

(72) Inventors: Ronald Cagle, Crystal Lake, IL (US); David Beck, Crystal Lake, IL (US)

(73) Assignee: Sage Products, LLC, Cary, IL (US)

( * ) Notice: Subject to any disclaimer, the term of this patent is extended or adjusted under 35 U.S.C. 154(b) by 3 days.

(21) Appl. No.: 17/734,202

(22) Filed: May 2, 2022

(65) Prior Publication Data

US 2022/0248836 A1 Aug. 11, 2022

Related U.S. Application Data

(62) Division of application No. 15/949,995, filed on Apr. 10, 2018, now Pat. No. 11,317,708.
(Continued)

(51) Int. Cl.
*A46B 11/00* (2006.01)
*A46B 9/00* (2006.01)
(Continued)

(52) U.S. Cl.
CPC .......... *A46B 11/0003* (2013.01); *A46B 9/005* (2013.01); *A46B 9/04* (2013.01);
(Continued)

(58) Field of Classification Search
CPC ............ A61C 17/0202; A61C 17/0205; A61C 17/0208; A61C 17/0211; A61C 17/0217;
(Continued)

(56) References Cited

U.S. PATENT DOCUMENTS

| 1,092,433 A | 4/1914 | Cox et al. |
| 3,957,051 A | 5/1976 | Topham |
| (Continued) | | |

FOREIGN PATENT DOCUMENTS

| GB | 2307674 | * | 6/1997 | ............. B65D 35/22 |
| KR | 20140102886 A | | 8/2014 | |

OTHER PUBLICATIONS

International Search Report and Written Opinion for International Application No. PCT/US2018/026957, mailed Jul. 4, 2018, 14 pages.

*Primary Examiner* — Nicholas D Lucchesi
*Assistant Examiner* — Hao D Mai
(74) *Attorney, Agent, or Firm* — FOLEY & LARDNER LLP (57) ABSTRACT

An oral fluid delivery device includes a housing forming at least one cavity. The cavity includes at least two reservoirs, a first reservoir and a second reservoir. The device also includes an elongated neck with a distal end having at least one distal opening for passage of a fluid, a proximal end, and a channel fluidly connected to the distal opening. The device also includes a cap at the proximal end of the elongated neck. The cap includes at least one aperture aligned with the channel of the elongated neck and is rotatably coupled to the housing such that rotating the cap relative to the housing selectively aligns the aperture with a first reservoir opening to provide fluid communication between the first reservoir and the channel, or aligns the aperture with a second reservoir opening to provide fluid communication between the second reservoir and the channel.

12 Claims, 8 Drawing Sheets

Related U.S. Application Data (60) Provisional application No. 62/483,659, filed on Apr. 10, 2017.

(51) Int. Cl.
*A46B 9/04* (2006.01)
*A61C 17/02* (2006.01)

(52) U.S. Cl.
CPC ...... *A46B 11/0041* (2013.01); *A61C 17/0202* (2013.01); *A61C 17/0208* (2013.01); *A46B 2200/1066* (2013.01)

(58) Field of Classification Search
CPC . A46B 11/0003; A46B 11/0041; A46B 9/005; A46B 9/04; A46B 2200/1066
See application file for complete search history.

(56) References Cited

U.S. PATENT DOCUMENTS

| | | | |
|---|---|---|---|
| 4,288,006 A * | 9/1981 | Clover, Jr. | B65D 47/265 222/42 |
| 5,174,475 A | 12/1992 | Day et al. | |
| 5,301,842 A | 4/1994 | Ritter | |
| 5,488,949 A | 2/1996 | Kreifels et al. | |
| 5,817,055 A | 10/1998 | Ljungquist | |
| 5,891,087 A | 4/1999 | Ohtani et al. | |
| 6,258,067 B1 | 7/2001 | Hill | |
| 6,269,704 B1 | 8/2001 | Ziv et al. | |
| 6,436,067 B1 | 8/2002 | Deng et al. | |
| 7,090,097 B1 | 8/2006 | Kazarian et al. | |
| 7,175,612 B2 | 2/2007 | Felix et al. | |
| 7,311,456 B1 | 12/2007 | Neal | |
| 7,503,902 B2 | 3/2009 | Jensen et al. | |
| 7,854,721 B2 | 12/2010 | Peuker et al. | |
| 8,365,958 B2 | 2/2013 | Ho et al. | |
| 8,414,544 B2 | 4/2013 | Resca | |
| 8,544,480 B1 | 10/2013 | Greene | |
| 8,876,786 B2 | 11/2014 | Nilsson et al. | |
| 9,878,106 B2 | 1/2018 | Naftalovitz et al. | |
| 10,413,384 B2 | 9/2019 | Bublewitz et al. | |
| 2003/0040701 A1 | 2/2003 | Dalmose | |
| 2007/0020032 A1 | 1/2007 | Abbas | |
| 2007/0183838 A1 | 8/2007 | Umar | |
| 2008/0255498 A1 | 10/2008 | Houle | |
| 2011/0067193 A1 | 3/2011 | Olson | |
| 2011/0159456 A1 | 6/2011 | Cuevas et al. | |

* cited by examiner

TWIST SEAL ORAL FLUID DELIVERY DEVICE

CROSS-REFERENCE TO RELATED PATENT APPLICATIONS

This application is a divisional of U.S. patent application Ser. No. 15/949,995, filed Apr. 10, 2018, which claims the benefit of and priority to U.S. Provisional Patent Application No. 62/483,659, filed Apr. 10, 2017, both of which are hereby incorporated by reference in their entireties.

BACKGROUND

The present disclosure relates generally to the field of oral care devices. More specifically, the disclosure relates to single use, disposable oral care devices.

Commonly used standard toothbrush designs are not suitable for use in hospitals or other medical treatment facilities, where patients may have compromised immune systems. In these settings, there is an increased risk of contracting pneumonia. Accordingly, compliance to a proper oral care regimen, which includes brushing three to four times per day, is important.

Use of a standard toothbrush, due to its repeated reuse, creates a risk of bacterial infection. Standard toothbrushes are also not suitable for some patients because patients may be unable to spit or otherwise voluntarily remove liquids from their mouths, may not have easy access to water, or may have difficulty holding and using a toothbrush having the standard size and shape. Standard toothpaste may also be unsuitable for use by such patients, and it may be difficult for the patient to find and apply the proper amount to a toothbrush.

In many circumstances, medical procedures, such as oral care, must be repeated multiple times. For example, in medical care and with particular reference to oral care, a series of mouth care products must be used in a repetitious fashion, such as for periodic cleaning sessions, where there can be evacuation, brushing of the teeth, and swabbing of the mouth and gums. With the repetition of each procedure occurring after a predetermined interval, such as every few hours, it may be cumbersome for the healthcare provider, or the patient, to gather the necessary instrument(s) repeatedly throughout the day.

The exemplary embodiments disclosed herein address the aforementioned issues surrounding proper oral care in a hospital setting. Certain disclosed embodiments provide a single-use, disposable oral care device, such as a toothbrush, which can be easily activated to provide oral care fluid and suction through the device to improve ease of use, and ultimately, compliance with the regimen.

BRIEF DESCRIPTION OF THE DRAWINGS

The following disclosure as a whole may be best understood by reference to the provided detailed description when read in conjunction with the accompanying drawings. Identical reference numbers, when found on different figures, identify the same elements or functionally equivalent elements.

DETAILED DESCRIPTION

The present disclosure is not limited to the particular details of the apparatus depicted, and other modifications and applications may be contemplated. Further changes may be made in the devices, apparatus, or methods without departing from the true spirit and scope of the disclosure herein involved. It is intended, therefore, that the subject matter in this disclosure should be interpreted as illustrative, not in a limiting sense.

Present embodiments relate to an improved oral care product that improves compliance with an oral care plan by providing all necessary tools and accessories for completing the oral care plan without requiring significant effort for a patient or health care provider. According to an exemplary embodiment, a single use oral care system (e.g. an oral fluid delivery device) for use in a hospital setting includes an oral fluid delivery device 100 (shown in FIG. 1).

Figure 1:
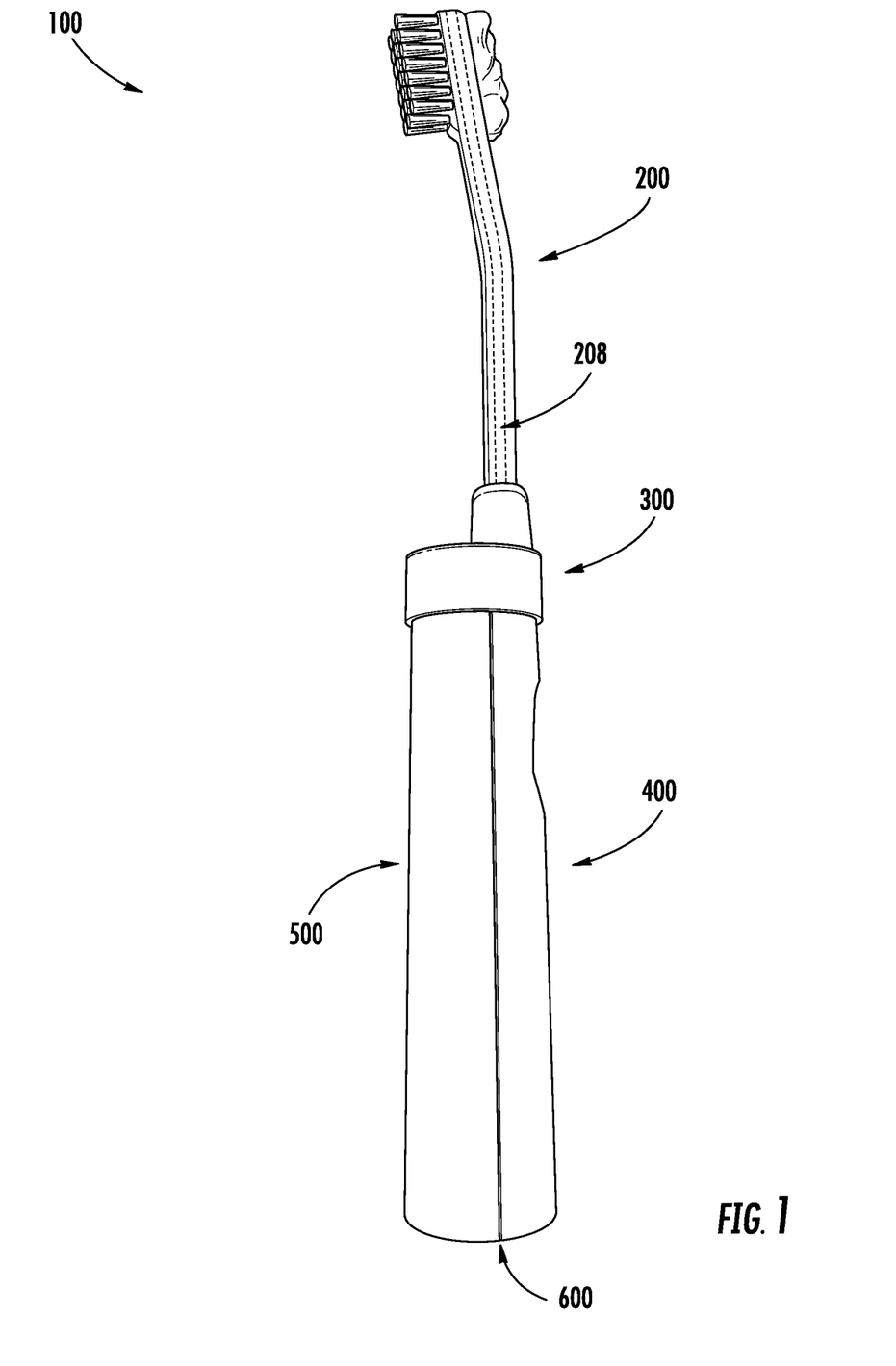
FIG. 1 is a perspective view of an oral fluid delivery device, according to an exemplary embodiment.

Referring to FIG. 1, a perspective view of an oral fluid delivery device 100 is shown, according to an exemplary embodiment. The oral fluid delivery device 100 includes a head portion 200, a cap 300, and a housing 600 (e.g., a handle portion) defining at least one cavity. In one embodiment, the housing 600 includes a first portion 400 and a second portion 500. The first portion 400 and the second portion 500 of the housing 600 define the cavity in which a first reservoir and a second reservoir are contained.

Figure 2A:
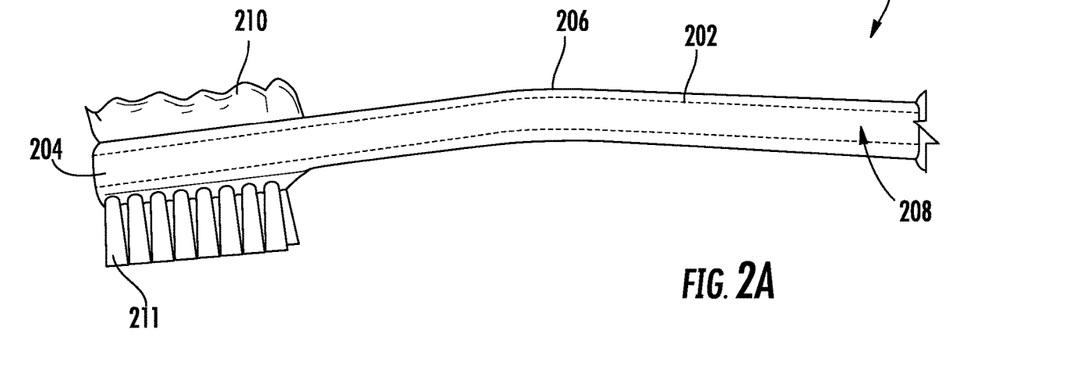
FIG. 2A is a side view of a cleaning head portion of the oral fluid delivery device of FIG. 1, according to an exemplary embodiment.
Figure 2B:
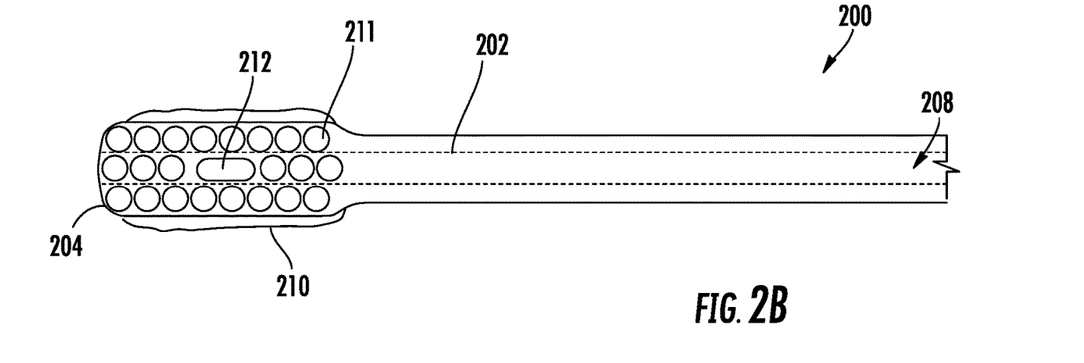
FIG. 2B is a front view of a cleaning head portion of the oral fluid delivery device of FIG. 1, according to an exemplary embodiment.
Figure 2C:
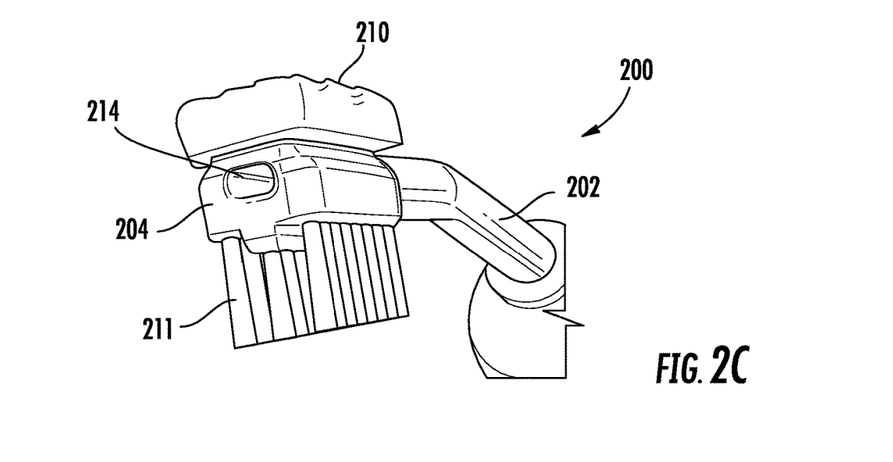
FIG. 2C is a top perspective view of a cleaning head portion of the oral fluid delivery device of FIG. 1, according to an exemplary embodiment.

Referring to FIGS. 2A-2C, a head portion 200 of the oral fluid delivery device 100 is shown, according to an exemplary embodiment. The head portion 200 includes an elongated neck 202 and cleaning head 204, located at a distal end of the elongated neck 202. In the embodiment shown, the elongated neck 202 includes a bend 206. The cleaning head 204 located at the distal end of the elongated neck, can include cleaning components (e.g., 210 and/or 211) and distal fluid openings (e.g., 212 and/or 214).

The elongated neck 202 extends away from the cap 300 of the oral fluid delivery device 100. The elongated neck 202 may be provided with various lengths on different oral fluid delivery devices 100 to allow a healthcare provider to select a length appropriate for a given patient (e.g., a child, adult, etc.). In some embodiments, the elongated neck 202 includes the bend 206 such that the cleaning head 204 of elongated neck 202 is not along the same axis as a portion of the elongated neck 202. In some embodiments, the bend 206 is subtle (e.g., 5 degrees from the axis of the elongated neck 202), substantial (e.g., 90 degrees), or any angle in between. The bend 206 assists a user to reach teeth further back in a mouth with the cleaning head 204 and manipulate the head portion 200 to various areas of the mouth. The bend 206 may also increase comfort while brushing by reducing strain on a wrist of the user as the cleaning head 204 is moved to various locations in the mouth.

The cleaning head 204 provides cleaning or brushing components (e.g., 211 and/or 210) and/or fluid openings (e.g., 212 and/or 214). In some embodiments, the cleaning head 204 includes bristles 211 extending away from the cleaning head 204. In some embodiments, the cleaning head 204 includes a sponge 210. In some embodiments, the cleaning head 204 includes both the bristles 211 and the sponge 210 on opposite faces of the cleaning head 204. In some embodiments, the bristles 211 provide a rougher surface for brushing, while the sponge 210 provides a more gentle surface for cleaning or brushing. In some embodiments, the cleaning head 204 includes the bristles 211 and/or the sponge 210. In some embodiments, the user or practitioner selectively couples the bristles 211 and/or sponge 210 to the cleaning head 204 (e.g., via adhesive, a snap, a slide configuration, etc.). In some embodiments, a variety of heads 204 with various combinations of bristles 211 and/or sponges 210 are available for the healthcare provider to select and couple (e.g., via adhesive, a snap, a slide configuration, etc.) the cleaning head 204 to the elongated neck 202 to select an appropriate head portion 200 for a specific user.

The cleaning head 204 includes at least one fluid opening (e.g., 212 and/or 214). The fluid openings provide an opening into an internal channel 208 located in the elongated neck 202 of the head portion 200. In some embodiments, the internal channel 208 runs the entire length of the elongated neck 202 to provide a fluid connection between an aperture 312 in the cap 300 (described below) and the cleaning head 204. In this way, a fluid connection is provided between the first portion 400 and the cleaning head 204 and/or the second portion 500 and the cleaning head 204 of the oral fluid delivery device 100. The cleaning head 204 includes a fluid opening 212 that extends through a depth of the cleaning head 204 such that both faces of the cleaning head 204 include the fluid opening 212. In some embodiments, the opening 212 does not extend though the entire cleaning head 204, but only is present on one side of the cleaning head 204 (e.g., only on the side with the bristles 211 or the sponge 210). In some embodiments, the cleaning head 204 includes a top fluid opening 214 located at a top of the cleaning head 204. According to some embodiments disclosed herein, the cleaning head 204 includes any combination of fluid openings 212 and/or 214, such that there are one, two or three fluid openings. However, in other embodiments, the cleaning head 204 includes more or less fluid openings. In some embodiments, the cleaning head 204 includes only one or more fluid openings without other cleaning or brushing components, such as bristles or sponges.

Figure 3A:
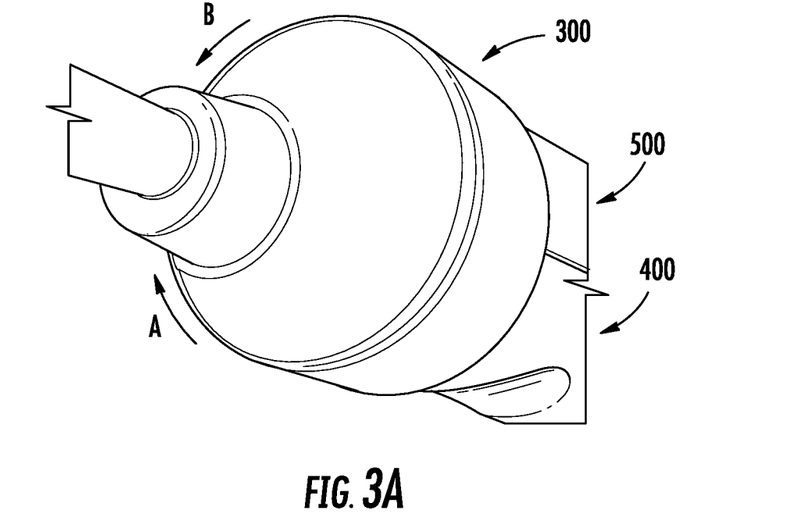
FIG. 3A is a perspective view of a cap of the oral fluid delivery device of FIG. 1, according to an exemplary embodiment.
Figure 3B:
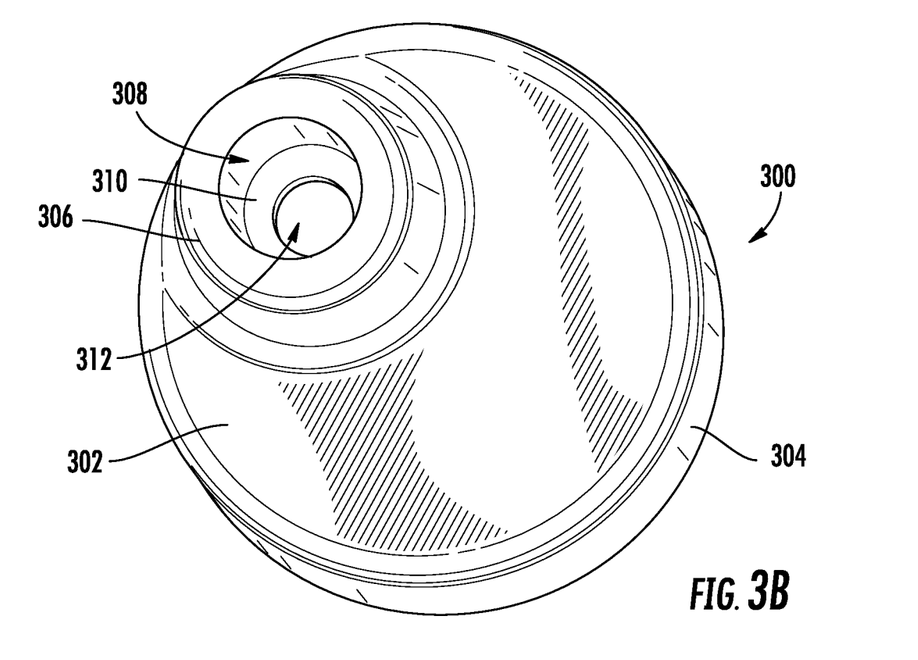
FIG. 3B is a top view of a cap of the oral fluid delivery device of FIG. 1, according to an exemplary embodiment.
Figure 3C:
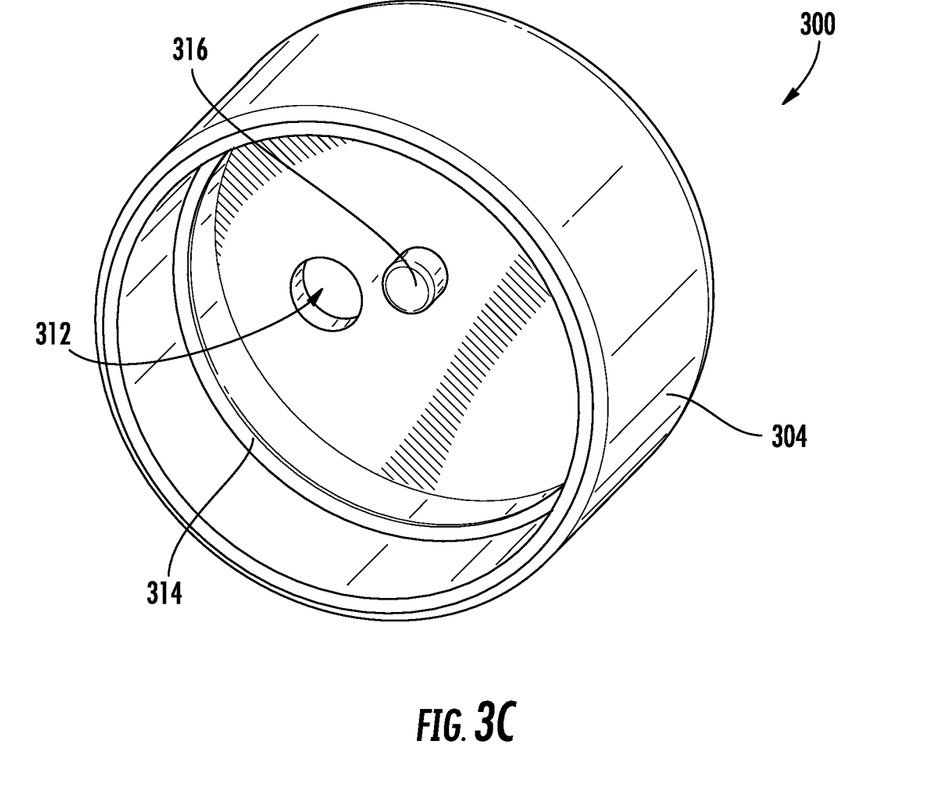
FIG. 3C is a bottom perspective view of a cap of the oral fluid delivery device of FIG. 1, according to an exemplary embodiment.

Referring to FIGS. 3A-3C, the cap 300 of the oral fluid delivery device 100 is shown, according to an exemplary embodiment. The cap 300 is cylindrical and is rotatably coupled to the housing 600 such that the cap 300 can be rotated in a first direction, A, and a second direction, B, to provide a twist seal configuration for the oral cleaning device 100. The cap 300 includes a top 302 and a fluid aperture 312. The cap also include sides 304 and an extension 306. In some embodiments, the top includes a knob 316. The extension 306 includes a receiving channel 308, and a lip 310 surrounding the fluid aperture 312. The sides 304 include a ridge 314.

The top 302 of the cap 300 covers the housing 600 to create a seal between the cap 300 and the first portion 400 and the second portion 500. Extension 306 extends upward from the top 302 of the cap 300 to provide coupling between the cap 300 and the head portion 200. The extension 306 is cylindrical and includes a receiving channel 308 that receives a proximal end of the elongated neck 202 of the head portion 200. The extension 306 also includes the lip 310. The lip 310 surrounds the fluid aperture 312, which has a smaller diameter than the receiving channel 308. In some embodiments, the fluid aperture 312 has a diameter smaller than the diameter of the receiving channel 308. In some embodiments, the lip 310 is an extension of the top 302 into the receiving channel 308, such that the fluid aperture 312 has a depth similar to a thickness of the top 302. The lip 310 also provides a lower support for the elongated neck 202 of the head portion 200 to prevent the elongated neck 202 from entering the fluid aperture 312.

The sides 304 of the cap 300 wrap around the housing 600 and include the ridge 314 to couple the cap 300 to the housing 600 and allow rotation of the cap 300 about the housing 600. The knob 316 is located on an underside of the top 302 to provide a center of rotation for the cap 300. The ridge 314 is configured to allow rotation of the cap 300 in the first direction, A, and the second direction, B, about a longitudinal axis of the housing 600. In some embodiments, the cap 300 is able to rotate in 360 degrees in both the first direction, A, and the second direction, B. In some embodiments, the cap 300 is limited in rotation in the first direction, A, and the second direction, B, such that the cap 300 is only able to rotate 180 degrees in either direction. However, this is not meant to be limiting and the cap 300 may be limited in rotation in any range of motion between 0 and 360 degrees in the first and second directions A, B.

Figure 4A:
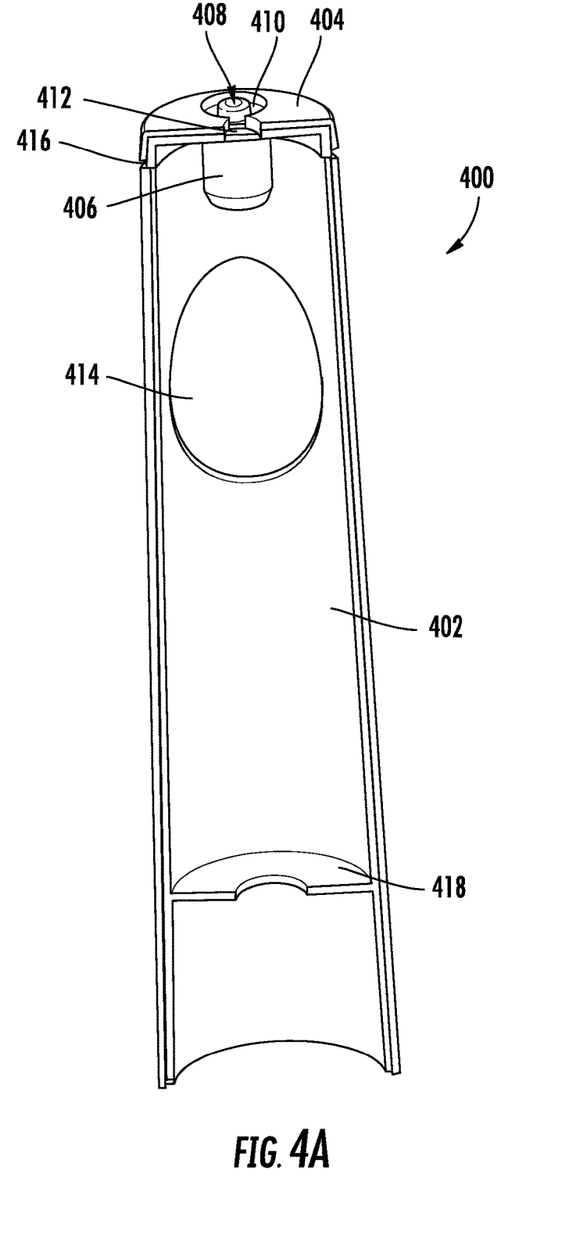
FIG. 4A is an interior view of a first portion of a handle of the oral fluid delivery device of FIG. 1, according to an exemplary embodiment.
Figure 4B:
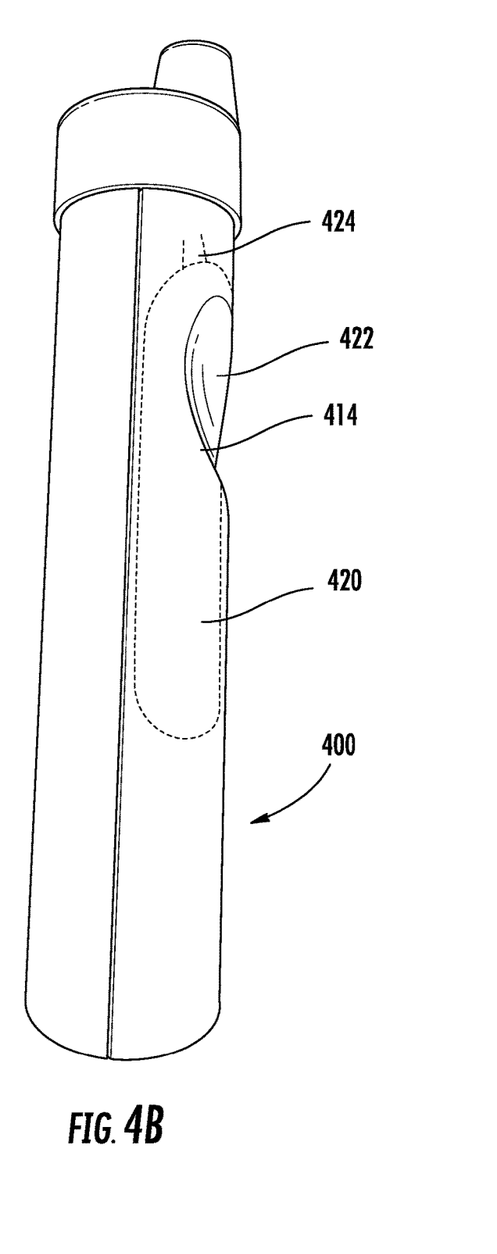
FIG. 4B is a perspective view of a handle of the oral fluid delivery device of FIG. 1, according to an exemplary embodiment.

Referring to FIGS. 4A-4B, the first portion 400 of the housing 600 of the oral fluid delivery device 100 is shown, according to an exemplary embodiment. The first portion 400 includes a side 402, a top 404 and a coupling mechanism 406. The first portion 400 houses one of a first and second reservoir held in the cavity of the housing 600. In the embodiment shown, the first portion 400 at least partially surrounds a first reservoir, such as fluid reservoir 420.

The fluid reservoir 420 is a hollow mechanism that houses fluid (e.g., antiseptic, toothpaste, water, etc.) for cleansing the mouth of the user. The fluid reservoir 420 also includes a coupling tube 424 that extends away from the fluid reservoir 420 to couple the fluid reservoir 420 to the first portion 400 of the housing 600. In some embodiments, the fluid reservoir 420 is, or carries, a container such that when a force is exerted on the container, fluid is expelled through the coupling tube 424. In some embodiments, the container comprises a frangible element that prevents the flow of fluid from the fluid reservoir 420. The frangible element is configured to withstand a defined amount of force before breaking, where upon breaking, fluid is able to flow through the coupling tube 424. In some embodiments, the container is deformable, and in such embodiments, the deformable container may be a burst pouch.

The side 402 is a semi-circular cylinder. In some embodiments, the side 402 expands in diameter as the side 402 extends away from the cap 300, such that the housing 600 has a conical shape, for example, to ease in the manufacturing process of the housing, such as by injection molding. The side 402 includes an opening 414 in an upper portion of the side 402. The opening may be elliptical. Opening 414 allows a portion 422 of the fluid reservoir 420 to be accessible to a user from an exterior of the housing 600. In this way, the user can exert force on the portion 422 of the fluid reservoir 420 to expel fluid such as an oral solution. In some embodiments, the opening 414 is a shape other than an elliptical, such as a circle, square, etc.

The top 404 couples to an upper portion of the side 402. In some embodiments, the top 404 and the side 402 are integral with one another. The coupling mechanism 406 extends below the top 404 inside the first portion 400. The coupling mechanism 406 defines a channel 408 (e.g., an opening) that extends through the coupling mechanism 406 and through the top 404 of the first portion 400. The coupling mechanism 406 receives the coupling tube 424 of the fluid reservoir 420 such that fluid expelled from the fluid reservoir 420 travels through the channel 408.

Figure 6A:
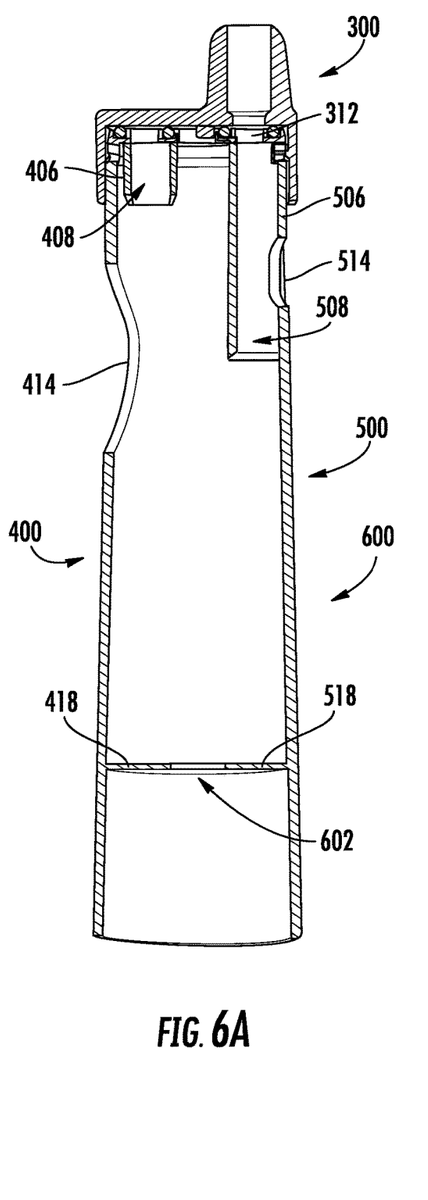
FIG. 6A is a cross sectional view of a handle of the oral fluid delivery device of FIG. 1, according to an exemplary embodiment.
Figure 6B:
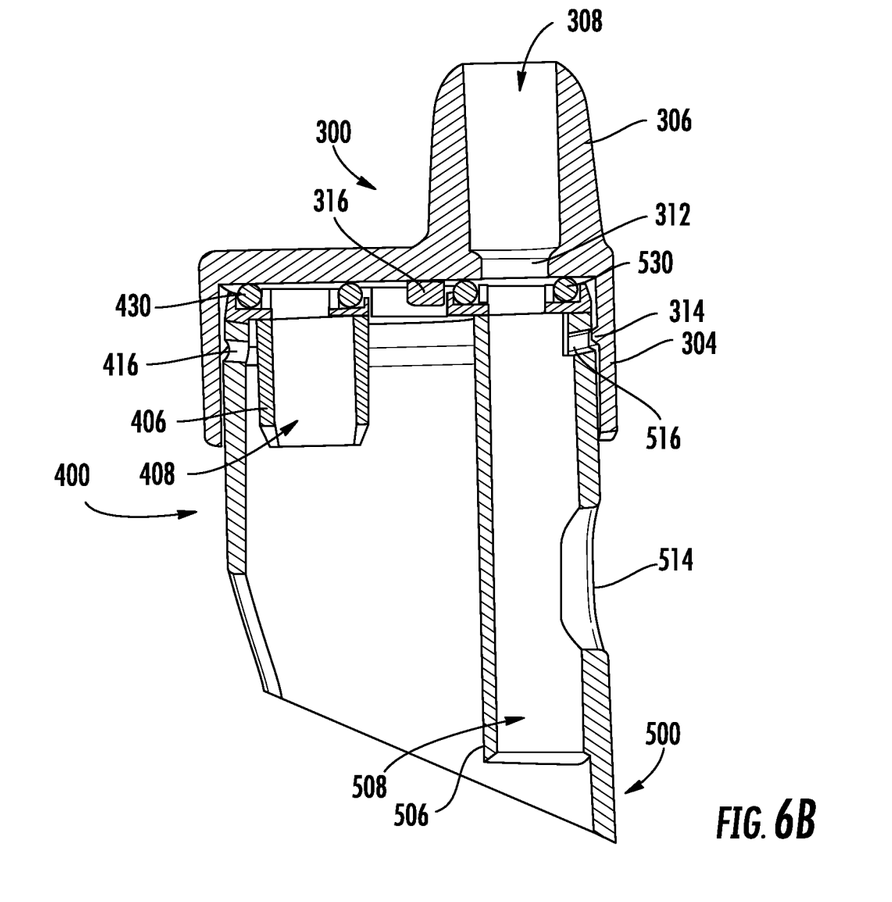
FIG. 6B is a cross-sectional, close up view of an upper portion of a handle of the oral fluid delivery device of FIG. 1, according to an exemplary embodiment.

In some embodiments, a top side of the top 404 also includes a ring shaped recess 410 that extends into the top 404 such that the ring shaped recess 410 can receive a resilient member such as a gasket 430 (shown in FIGS. 6A and 6B). In certain embodiments, the gasket 430 is an O-ring. While the ring shaped recess 410 is described as receiving a gasket or an O-ring, this is not meant to be limiting and other seals, gaskets and rings may also be used alone or in combination. The channel 408 extends through the center of the ring shaped recess 410 to a surface flush with the top 404. The top 404 also includes a divot 412 that receives a portion of the knob 316 to secure the cap 300 in rotation. The top 404 also includes a groove 416 surrounding the top 404. In some embodiments, the groove 416 is located on the side 402 of the first portion 400 rather than the top 404. The groove 416 receives the ridge 314 of the cap to allow rotation of the cap 300.

The first portion 400 also includes a bottom 418. In some embodiments, the bottom 418 is crescent shaped. In some embodiments, the bottom 418 has a semi-circular cut-out opposite the side 402. In some embodiments, the bottom 418 is located at a bottom of the side 402. In some embodiments, the bottom 418 is located in a lower portion of the side 402, with a space between a bottom of the side 402 and the bottom 418.

Figure 5A:
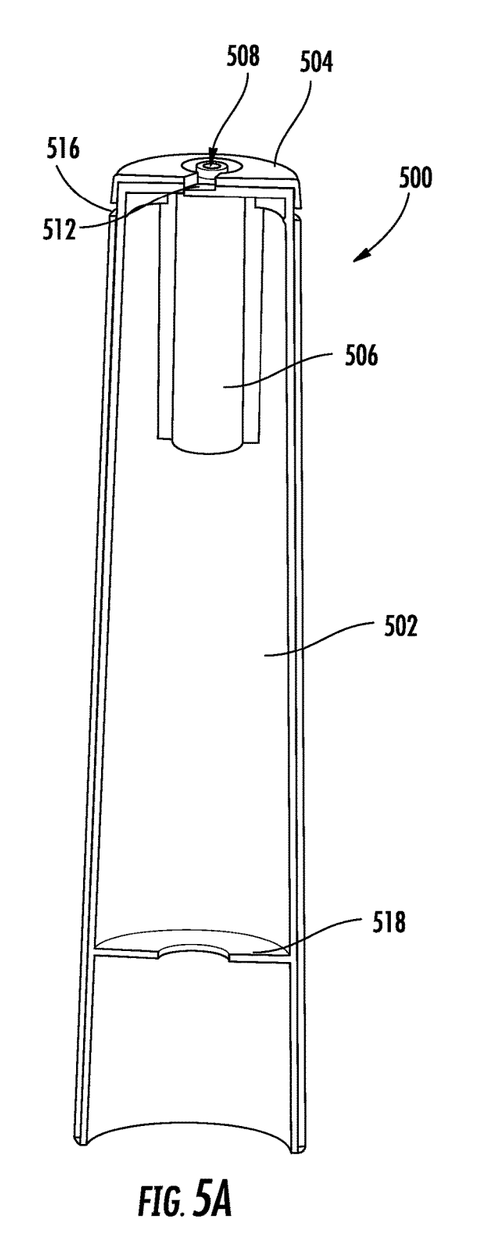
FIG. 5A is an interior view of a second portion of a handle of the oral fluid delivery device of FIG. 1, according to an exemplary embodiment.
Figure 5B:
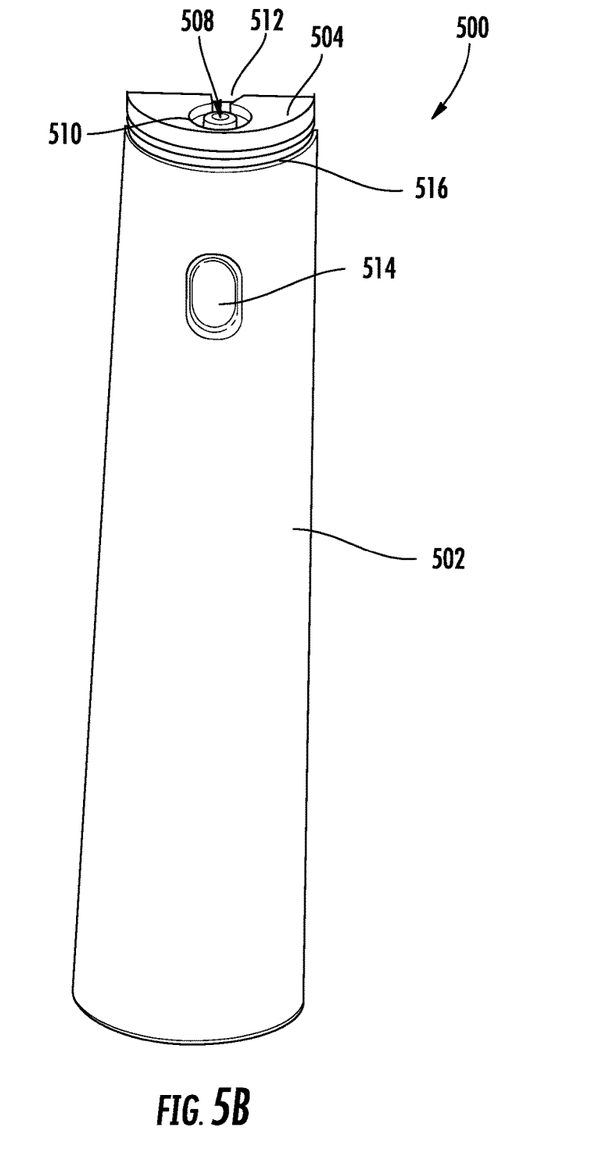
FIG. 5B is an exterior view of a second portion of a handle of the oral fluid delivery device of FIG. 1, according to an exemplary embodiment.
Figure 5C:
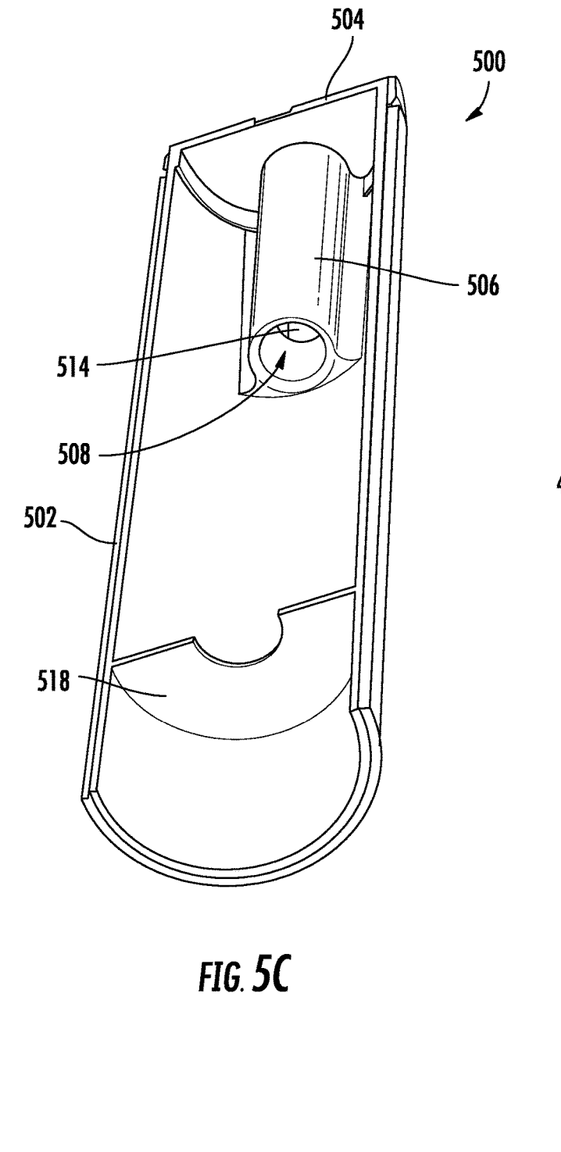
FIG. 5C is a perspective view of a second portion of a handle of the oral fluid delivery device of FIG. 1, according to an exemplary embodiment.

Referring to FIGS. 5A-5C, the second portion 500 of the housing 600 of the oral fluid delivery device 100 is shown, according to an exemplary embodiment. The second portion 500 includes a side 502 and a top 504. In the embodiment shown, the second portion 500 houses or at least partially surrounds a second reservoir, such as a suction reservoir and/or a suction tube (shown in FIG. 6C).

The side 502 is a semi-circular cylinder. In some embodiments, the side 502 expands in diameter as the side 502 extends away from the cap 300, such that the housing 600 has a conical shape, for example, to ease in the manufacturing process of the housing, such as by injection molding. In some embodiments, the side 502 includes an opening that forms a suction adjustment opening 514 in an upper portion of the side 502. The suction adjustment opening 514 may be elliptical in shape. The suction adjustment opening 514 is sized in such a way that a user is able to cover the entirety of the suction adjustment opening 514 with a thumb or other finger. The user can then create an enclosed channel to allow the formation of suction. In some embodiments, the suction adjustment opening 514 is a shape other than an elliptical, such as a circle, square, etc. In some embodiments, the suction adjustment opening 514 provides adjustment of the suction.

The top 504 couples to an upper portion of the side 502. In some embodiments, the top 504 and the side 502 are integral with one another. The suction reservoir 506 extends below the top 504 inside the second portion 500. The suction reservoir 506 defines a channel 508 (e.g., an opening) that extends through the suction reservoir 506 and through the top 504 of the second portion 500. The suction reservoir 506 is located such that the suction adjustment opening 514 is located within the suction reservoir 506. The suction reservoir 506 receives the suction mechanism (e.g., a vacuum source, etc.) such that suction causes fluid to travel through the channel 508.

The suction outlet 604 couples to the suction reservoir 506 at a coupling end. In embodiments that have the suction adjustment opening 514, the suction outlet 604 is coupled to the suction reservoir 506 below the suction adjustment opening 514 such that the suction is through the suction adjustment opening 514 until a user places a thumb or finger over the suction adjustment opening 514, or otherwise obstructs the suction adjustment opening 514. Once a thumb or finger is placed over the suction adjustment opening 514, the suction then occurs through the channel 508 and through the cleaning head 204.

The top 504 also includes a ring shaped recess 510 that extends into the top 504 such that the ring shaped recess 510 can receive a resilient member such as a gasket 530 (shown in FIGS. 6A and 6B). In certain embodiments, the gasket 530 is an O-ring. While the ring shaped recess 510 is described as receiving a gasket or an O-ring, this is not meant to be limiting and other seals, gaskets and rings may also be used alone or in combination. The channel 508 extends through the center of the ring shaped recess 510 to a surface substantially flush with the top 504 or slightly above the top 504. The top 504 also include a divot 512 that receives a portion of the knob 316 to secure the cap 300 in rotation. The top 504 also includes a groove 516 surrounding the top 504. In some embodiments, the groove 516 is located on the side 502 of the second portion 500 rather than the top 504. The groove 516 receives the ridge 314 to allow rotation of the cap 300.

The second portion 500 also includes a bottom 518. In some embodiments, the bottom 518 is crescent shaped. In some embodiments, the bottom 518 has a semi-circular cut-out opposite the side 502. In some embodiments, the bottom 518 is located at a bottom of the side 502. In some embodiments, the bottom 518 is located in a lower portion of the side 502, with a space between a bottom of the side 502 and the bottom 518.

Figure 6C:
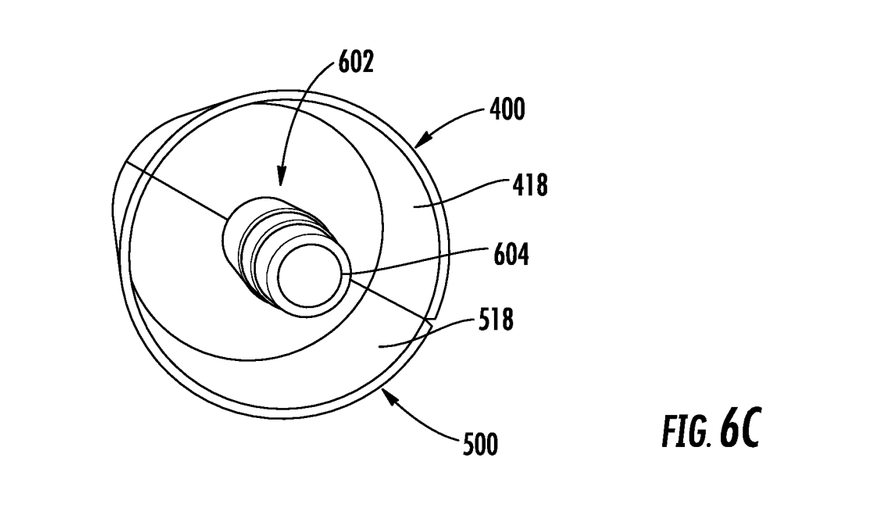
FIG. 6C is a perspective view of a bottom of a handle of the oral fluid delivery device of FIG. 1, according to an exemplary embodiment.

Referring to FIGS. 6A-6C, the housing 600 of the oral fluid delivery device 100 is shown, according to an exemplary embodiment. The first portion 400 and the second portion 500 couple together for form the housing 600. In some embodiments, the first portion 400 and the second portion 500 are a single unit. A first portion O-ring gasket 430 and a second portion O-ring gasket 530 can be seen in FIGS. 6A and 6B. In some embodiments, the grooves 416 and 516 limit the rotation of the cap 300.

The fluid aperture 312 of the cap 300 can be rotated to selectively align with, and therefore, fluidly couple with channel 408 of the first portion 400 or channel 508 of the second portion 500. In this way, the aperture becomes fluidly coupled with one of the first reservoir or the second reservoir in the cavity. More specifically, the cap 300 is turned to selectively activate, when in a first position, the suction outlet 604 by aligning the fluid aperture 312 to the channel 408 of the first portion 400 which is coupled to the coupling tube 424 of the fluid reservoir (i.e., the first reservoir). In a second position, the cap 300 is turned to selectively activate the fluid reservoir by aligning the fluid aperture 312 with the channel 508 of the second portion 500 which is in fluid communication with the suction reservoir 506. In a third position, the cap is turned such that the fluid aperture 312 is aligned with neither the first channel 408 or the second channel 508, such that there is no fluid communication with either the fluid reservoir 420 or the suction reservoir 506. In some embodiments, the cap 300 is limited in rotation to make coupling the fluid aperture 312 to one of the channel 408 of the first portion 400 or the channel 508 of the second portion 500 more precise. In some embodiments, a rotational distance between alignment of the aperture 312 with the channel 408 and with the channel 508 is between 90 and 180 degrees. In another embodiment, a rotational distance between alignment of the aperture 312 with the channel 408 and with the channel 508 is about 180 degrees. In another embodiment, a rotational distance between alignment of the aperture 312 with the channel 408 and with the channel 508 is between 15 and 45 degrees.

When the cap 300 is in a first position the fluid aperture 312 couples to the channel 408 to allow fluid flow between fluid reservoir 420 and the fluid openings 212 and/or 214 of the cleaning head 204. When the cap 300 is in a second position the fluid aperture 312 couples to the channel 508 to allow air flow between the suction outlet 604 and the fluid openings 212 and/or 214 of the cleaning head 204. When the cap 300 is in a third position the fluid aperture 312 is not aligned with the channel 408 or the channel 508, interrupting and therefore removing fluid communication.

The bottom 418 of the first portion 400 and the bottom 518 of the second portion 500 abut one another to form an opening 602 that allows the suction outlet 604 to extend through. In some embodiments, the oral fluid delivery device 100 includes the equipment necessary to create suction. In some embodiments, a suction mechanism or vacuum source must be coupled to the suction outlet 604 to provide suction. In some embodiments, the distance between the bottoms 418 and 518 and the bottom of the housing 600 allows the suction mechanism to couple to the housing 600. In some embodiments, the housing 600 is threaded to provide a more secure coupling between the suction device and the housing 600.

In some embodiments, the oral fluid delivery device 100 described above comes packaged individually or packaged as a kit including three or four oral care systems. Therefore, a healthcare provider can leave a kit for a patient in the morning and the patient will have the correct number of oral care systems that the patient should be using in a given day.

One of skill in the art will recognize that all the various components identified in the disclosure may be made from any material or combination of materials suitable for the usage and environment, including, without limitation, metals, composites, engineered plastics, natural or synthetic materials, etc. Furthermore, such components may be formed in any conventional manner, such as by molding, casing, machining, cold or hot forming, forging, etc. Still further, such components may be finished in any conventional manner, such as painting, power coating, plating, etc., or may be unfinished.

Furthermore, while particular embodiments and methods have been shown and described, it is obvious to those skilled in the art that changes and modifications may be made without departing from the teachings of the disclosure. The matter set forth in the foregoing description and accompanying drawings is offered by way of illustration only and not as limitation. The actual scope of the disclosure is intended to be defined in the following claims when viewed in their proper perspective.

What is claimed is:

1. An oral fluid delivery device, the device comprising:
a housing forming at least one cavity, the cavity comprising at least a first reservoir and a second reservoir;
an elongated neck comprising a distal end having at least one distal opening for passage of a fluid, a proximal end, and a channel fluidly connected to the distal opening; and
a cap at the proximal end of the elongated neck, wherein the cap comprises at least one aperture aligned with the channel of the elongated neck;
wherein the cap is rotatably coupled to the housing and is rotatable relative to the housing a maximum of 180 degrees, and wherein the cap is rotatable between a maximum position in a first direction and a maximum position in a second direction, wherein rotating the cap to the maximum position in the first direction causes the at least one aperture of the cap to be aligned with an opening in the first reservoir and wherein rotating the cap to the maximum position in the second direction causes the at least one aperture of the cap to be aligned with an opening in the second reservoir.

2. The device of claim 1, further comprising a mechanism for flowing an oral solution from the first reservoir, through the channel and out the at least one distal opening.

3. The device of claim 2, wherein the mechanism for flowing the oral solution is a container holding the oral solution, such that when a force is exerted on the container, the oral solution is expelled to the first reservoir opening.

4. The device of claim 3, wherein the container further comprises a frangible element that prevents the flow of fluid, and wherein the frangible element can withstand a defined amount of force before breaking, which then allows the fluid to flow to the first reservoir opening.

5. The device of claim 1, wherein the second reservoir further comprises a suction outlet, the suction outlet adapted to receive a vacuum source.

6. The device of claim 5, wherein the second reservoir further comprises a suction adjustment opening.

7. The device of claim 1, wherein rotating the cap relative to the housing further selectively aligns the aperture with a top of the housing such that the aperture is not in fluid communication with either the first reservoir opening or the second reservoir opening.

8. The device of claim 1, wherein the housing comprises a first portion housing the first reservoir and a second portion housing the second reservoir, and wherein the first portion and the second portion form the cavity therebetween.

9. The device of claim 8, wherein the first portion comprises:
a top, a side wall, and a bottom,
wherein the top comprises a coupling mechanism and a channel extending through the coupling mechanism and through the top,
wherein the coupling mechanism is configured to couple with a coupling tube of a fluid reservoir, and
wherein the side wall comprises an opening to provide access to the fluid reservoir for a user to actuate the fluid reservoir and dispel fluid through the coupling tube.

10. The device of claim 9, wherein the fluid reservoir is deformable such that a force applied to the fluid reservoir causes the fluid to be expelled through the coupling tube.

11. The device of claim 8, wherein the second portion comprises:
a top, a side wall, a bottom, and a coupling mechanism,
wherein the coupling mechanism comprises a channel extending from a coupling end and through the top of the second portion; and
wherein the coupling end is configured to couple with a suction tube to create a vacuum within the channel of the coupling mechanism.

12. The device of claim 1, wherein the distal end of the elongated neck comprises a set of bristles, a sponge, or both.

\* \* \* \* \*